UNITED STATES PATENT OFFICE.

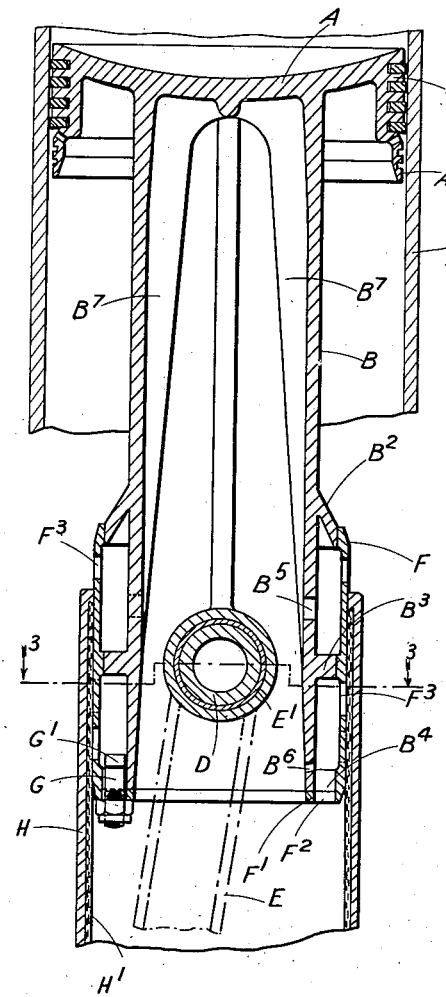
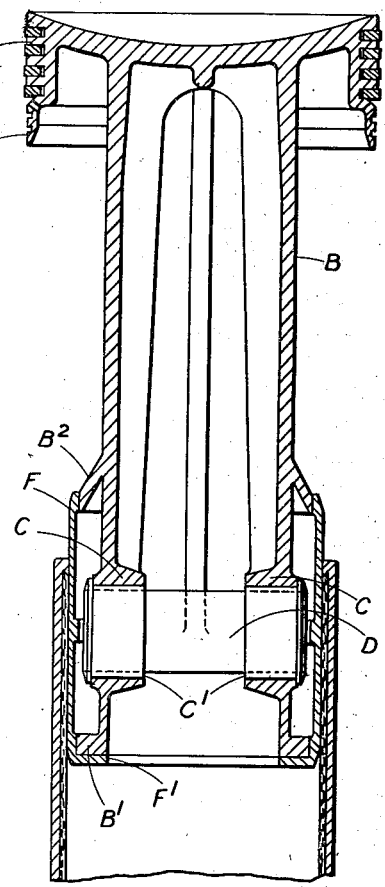
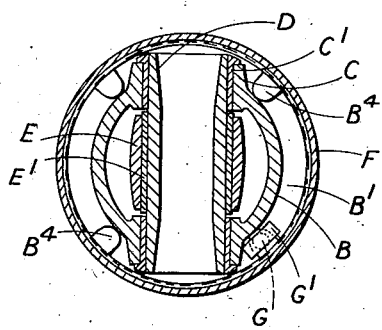

HARRY RALPH RICARDO, OF LONDON, ENGLAND.

PISTON FOR INTERNAL-COMBUSTION ENGINES.

1,346,845.

Specification of Letters Patent.  Patented July 20, 1920.

Application filed October 16, 1917. Serial No. 196,902.

*To all whom it may concern:*

Be it known that I, HARRY RALPH RICARDO, a subject of the King of England, and residing at London, in England, have invented certain new and useful Improvements in Pistons for Internal-Combustion Engines, of which the following is a specification.

This invention relates to pistons for internal combustion engines and has for its object to effect certain improvements in pistons constructed as described in the specification of the present inventor's application for U. S. Letters Patent Serial No. 77640.

As in the previous case the piston is formed of aluminium or aluminium alloy in two rigidly connected parts and comprises a disk having a solid face and peripheral flange grooved to receive piston rings, the disk constituting a part adapted to perform solely piston functions and being a free fit in the cylinder. A hollow projection of less diameter than the disk is formed integral with the disk on one face thereof and carries the gudgeon pin.

In the improved piston a sleeve or cylinder constructed of steel or other suitable metal is provided which fits over the end of the hollow projection to which it is rigidly connected, the sleeve serving to retain the gudgeon pin in place and constituting a guide adapted to take all lateral stresses communicated through the gudgeon pin and relieve the piston part of all guiding functions. The gudgeon pin is carried in bosses preferably bushed and formed in the opposite walls of the hollow projection and the end of the connecting rod is also preferably bushed so that the gudgeon pin can rotate both in the end of the connecting rod and also in the bosses. An outwardly directed flange or annular thickening or collar is formed at the open end of the hollow projection and another similar flange or annular thickening is formed at a suitable point in the length of the hollow projection in such a position that the gudgeon pin lies approximately midway between these external flanges. The sleeve or cylinder which constitutes the guide member fits closely over these flanges and the ends of the gudgeon pin which it retains in place the sleeve being provided at one end with an inturned flange adapted to abut against the end flange of the hollow projection. The sleeve and hollow projection are in the preferred arrangement rigidly connected together by screws or bolts passing through the end flanges or portions of the two parts. The sleeve may however be otherwise connected as for example by screw-threading corresponding and engaging parts of the two members so that the sleeve may be screwed on to the end of the projection and then retained by set screws or otherwise.

The guide member reciprocates in a cylinder which is preferably of smaller diameter than the main cylinder in which moves the piston portion, the arrangement being as described in the specification of the above mentioned application of earlier date. Under certain circumstances however as for instance in two-cycle engines it may be desirable to make the guide member and the cylinder in which it moves of larger diameter than the main cylinder. Again the guide member may have the same diameter as the piston part and reciprocate in the outer portion of the main cylinder. The annular space around the hollow projection may be employed for pumping purposes or air may be allowed to circulate around the guide cylinder so as to carry off the heat which is conveyed thereto from the piston through the hollow projection. The hollow projection may be formed in various ways but is preferably of cylindrical cross section throughout its length and provided on its interior with radially arranged strengthening ribs which preferably extend from the piston disk to the gudgeon pin bosses.

In the accompanying drawings,

Figure 1 is a longitudinal sectional elevation of a piston for an internal combustion engine constructed in accordance with the present invention, the section being taken in a plane at right angles to the gudgeon pin axis.

Fig. 2 is a similar view, the section being taken in a plane coincident with the gudgeon pin axis.

Fig. 3 is a transverse section on the broken line 3—3 of Fig. 1.

Like letters indicate like parts throughout the drawings.

That portion of the piston which performs solely piston functions comprises a disk A having a solid and unbroken face which is conveniently somewhat dished as shown in the drawings at that side on which act the gases in the cylinder when explosion occurs. This disk is provided with a peripheral flange A' in which are formed annular recesses to receive piston rings in the usual manner. The flange A' may conveniently be extended slightly as at $A^2$ beyond the piston rings and provided in that part with shallow annular grooves. The diameter of the flanged disk is such that it will be a free fit within the cylinder $A^3$ so that in effect the piston rings only bear against the cylinder walls in order that there may be no tendency for friction or wear to occur between the flange A' $A^2$ and the inner wall of the cylinder which may be formed of aluminium or aluminium alloy. On what may be termed the outer face of the disk A is formed integral with it a hollow projection B of suitable length and diameter and preferably cylindrical in cross-section. The general dimensions of this hollow projection are such as to enable it to convey heat away from the disk A in an efficient manner and with heat gradients of a desirable nature between the center and periphery of the disk respectively and the hollow projection.

At the outer open end of the projection B there is formed an outwardly directed collar or flange B' and at a suitable point in the length of the projection there is formed another external collar or flange $B^2$, the wall of the projection being materially thickened by these flanges. At some intermediate point between the flanges B' and $B^2$ and preferably approximately midway between these flanges the hollow projection has formed integral with it bosses C each of which carries a bushing C' within which lies and can freely rotate the gudgeon pin D. Preferably the latter which may be hollow as shown or solid, is not rigidly fixed in the end of the connecting rod E but carried in a bushing E' so that the gudgeon pin can turn freely in the end of the connecting rod as well as in the bosses C. Each boss C projects to some extent both on the interior and exterior of the hollow part B. The hollow projection B has a third annular thickened portion caused by the provision on its exterior of a third annular flange $B^3$ which lies in the same plane as the gudgeon pin axis this flange being broken or interrupted at the bosses C to allow of the insertion of the gudgeon pin. The whole of the piston portion A A' and the hollow projection B with its flanges are as mentioned formed integral and constructed of aluminium or aluminium alloy.

Radial slots or holes $B^4$ are formed in the end flange B'. Two series of holes $B^5$ and $B^6$ are formed as shown in Fig. 1 through the wall of the projection B respectively between the flanges $B^2$ and $B^3$ and the flanges $B^3$ and $B^4$ these holes serving for the passage of air and lubricant.

A sleeve or cylinder F constructed of steel or other suitable material having an inwardly directed flange F' at one end, is slipped over the end of the projection B the interior diameter of this sleeve being such that it will closely fit around and bear on the peripheral portions of the flanges B' $B^2$ and $B^3$. As shown in Fig. 1 the sleeve may be slightly thickened at the places where it bears on these flanges. The sleeve is of such length that when its end flange F' butts up against the annular thickened end portion of the projection the inner end of the sleeve does not extend beyond the upper annular thickened flange $B^2$. In the flange F' are formed a series of holes $F^2$ corresponding to the slots $B^4$ in the flange B' and through these holes and slots are passed bolts G by means of which the sleeve F is rigidly connected to the projection B. Each bolt G is provided with a head G' so shaped as to lie in the space between the outer wall of the port B and the inner wall of the sleeve F and prevent the bolt from turning. Holes $F^3$ are conveniently formed at suitable points in the length of the sleeve F so as to allow of the passage of lubricant and air. The sleeve F is of such overall diameter as to closely fit within a guide cylinder H provided conveniently with a lining of antifriction metal H'.

In an alternative arrangement the sleeve F may be suitably formed or thickened at the necessary places and internally screw-threaded to engage one or more of the flanges on the projection B which are correspondingly screw threaded. The sleeve may then be screwed into place on the end of the projection B and fixed by set screws or by bolts passing through the abutting flanges F' B'.

The hollow projection B is conveniently strengthened internally and its capacity for conveying away the heat from the piston portion A increased by forming on the interior of the projection radially disposed ribs or flanges $B^7$ which extend from the outer face of the disk A to the gudgeon pin bosses C the width of these flanges conveniently being reduced or tapered off toward the bosses.

What I claim as my invention and desire to secure by Letters Patent is:—

1. A piston for internal combustion engines comprising a flanged disk with a solid face constituting a piston head constructed and designed to perform its piston functions without thrust on the wall of the cylinder in which it reciprocates, said head having an integral, hollow, open ended projection of less diameter than the piston head with oppositely disposed bosses formed therein toward the open end thereof, and an external annular thickening at its open end, in combination with a gudgeon pin carried freely in said bosses, and a sleeve having an internal flange at one end, fitting over the end of the hollow projection and inclosing the ends of the gudgeon pin to keep it in place, the sleeve being rigidly secured to the hollow projection and adapted to take all lateral stresses communicated through the gudgeon pin.

2. A piston for internal combustion engines comprising a flanged disk with a solid face constituting a piston head constructed and designed to perform its piston functions without thrust on the wall of the cylinder in which it reciprocates, said head having an integral, hollow, open ended projection of less diameter than the piston head with oppositely disposed bosses formed therein toward the open end thereof and an external annular thickening at its open end, said hollow projection also having an external annular thickening formed thereon intermediate between the piston head and the gudgeon pin bosses, in combination with a gudgeon pin carried freely in said bosses, and a sleeve having an internal flange at its outer end and fitting over the end portion of the hollow projection with its inner end supported on the intermediate annular thickening, said sleeve inclosing the ends of the gudgeon pin to keep it in place, its end flange abutting against the annular thickening at the end of the projection to which the end flange is rigidly connected, the sleeve being adapted to take all lateral stresses communicated through the gudgeon pin.

3. A piston for internal combustion engines comprising a flanged disk with a solid face constituting a piston head constructed and designed to perform its piston functions without thrust on the wall of the cylinder in which it reciprocates, said head having an integral, hollow, open ended, projection of less diameter than the piston head with oppositely disposed bosses formed therein toward the open end thereof and an external annular thickening at its open end, in combination with a gudgeon pin carried freely in said bosses, a sleeve having an internal flange at one end fitting over the end of the hollow projection and inclosing the ends of the gudgeon pin to keep it in place, and bolts passing through the annular thickening at the end of the projection and through the flange at the end of the sleeve and serving to rigidly connect the sleeve to the projection.

4. A piston for internal combustion engines comprising a flanged disk with a solid face constituting a piston head constructed and designed to perform its piston functions without thrust on the wall of the cylinder in which it reciprocates, said head having an integral, hollow, open ended projection of less diameter than the piston head with oppositely disposed bosses formed therein toward the open end thereof and an external annular thickening at its open end, said hollow projection also having an external annular thickening formed thereon intermediate between the piston head and the gudgeon pin bosses and an external interrupted annular thickening formed thereon in the plane of the gudgeon pin axis, in combination with a gudgeon pin carried freely in said bosses, and a sleeve having an internal flange at one end fitting over the end of the hollow projection and supported on the annular thickenings thereon, said sleeve inclosing the ends of the gudgeon pin to keep it in place, the sleeve being rigidly secured to the hollow projection and adapted to take all lateral stresses communicated through the gudgeon pin.

5. A piston for internal combustion engines comprising a flanged disk with a solid face constituting a piston head constructed and designed to perform its piston functions without thrust on the wall of the cylinder in which it reciprocates, said head having an integral, hollow, open ended, projection of less diameter than the piston head with oppositely disposed bosses formed therein toward the open end thereof and an external annular thickening at its open end, said hollow projection having openings in the wall thereof for the passage of oil and air, in combination with a gudgeon pin carried freely in said bosses, and a sleeve having an internal flange at one end fitting over the end of the hollow projection and inclosing the ends of the gudgeon pin to keep it in place, the sleeve being rigidly secured to the hollow projection and being provided with openings in the wall thereof for the passage of oil and air.

6. A piston for internal combustion engines comprising a flanged disk with a solid face constituting a piston head constructed and designed to perform its piston functions without thrust on the wall of the cylinder in which it reciprocates, said head having an integral, hollow, open ended, projection of less diameter than the piston head with oppositely disposed bosses formed therein toward the open end thereof and an external annular thickening at its open end, in combination with a gudgeon pin carried freely in said bosses, a sleeve having an internal flange at one end, fitting over the end of the hollow projection and engaging the ends of the gudgeon pin to keep it in place, and bolts rigidly securing the sleeve to the hollow projection.

7. A piston for internal combustion engines comprising a flanged disk with a solid face constituting a piston head constructed and designed to perform its piston functions without thrust on the wall of the cylinder in which it reciprocates, said head having an integral, hollow, open ended, projection of less diameter than the piston head with oppositely disposed bosses formed therein toward the open end thereof and an external annular thickening at its open end, said projection having also inwardly directed ribs formed within the hollow projection and extending from the piston head toward the gudgeon pin bosses, an external annular thickening formed on the hollow projection intermediate between the piston head and gudgeon pin bosses, an external interrupted annular thickening formed on the hollow projection in the plane of the gudgeon pin, in combination with a gudgeon pin carried freely in said bosses, and a sleeve having an internal flange at one end, fitting over the end of the hollow projection and inclosing the ends of the gudgeon pin to keep it in place, the sleeve being rigidly secured to the hollow projection and adapted to take all lateral stresses communicated through the gudgeon pin.

8. A piston for internal combustion engines comprising a flanged disk with a solid face constituting a piston head constructed and designed to perform its piston functions without thrust on the wall of the cylinder in which it reciprocates, said head having an integral, hollow, open ended, projection of less diameter than the piston head with oppositely disposed bosses formed therein toward the open end thereof and an external annular thickening at its open end, said projection having also inwardly directed ribs formed within the hollow projection and extending from the piston head toward the gudgeon pin bosses, an external annular thickening formed on the hollow projection intermediate between the piston head and gudgeon pin bosses, an external interrupted annular thickennig formed on the hollow projection in the plane of the gudgeon pin, in combination with a gudgeon pin carried freely in said bosses, a sleeve having an internal flange at one end, fitting over the end of the hollow projection and inclosing the ends of the gudgeon pin to keep it in place, and bolts securing the sleeve to the hollow projection.

9. A piston for internal combustion engines comprising a flanged disk with a solid face constituting a piston head constructed and designed to perform its piston functions without thrust on the wall of the cylinder in which it reciprocates, said head having an integral, hollow, open ended projection, of less diameter than the piston head with oppositely disposed bosses therein toward the open end thereof, in combination with a gudgeon pin carried in said bosses, and a sleeve fitting over the end of the hollow projection and inclosing the ends of the gudgeon pin, the sleeve being rigidly secured to the hollow projection and adapted to take all lateral stresses communicated through the gudgeon pin.

10. A piston for internal combustion engines comprising a flanged disk with a solid face constituting a piston head constructed and designed to perform its piston functions without thrust on the wall of the cylinder in which it reciprocates, said head having an integral, hollow, open ended projection, of less diameter than the piston head with oppositely disposed bosses therein toward the open end thereof, said hollow projection having a flange, in combination with a gudgeon pin carried in said bosses, and a sleeve fitting over the end of the hollow projection and inclosing the ends of the gudgeon pin to keep it in place, said sleeve having a flange abutting against the flange on the hollow projection, the sleeve being rigidly secured to the hollow projection and adapted to take all lateral stresses communicated through the gudgeon pin.

11. A piston for internal combustion engines comprising a flanged disk with a solid face constituting a piston head constructed and designed to perform its piston functions without thrust on the wall of the cylinder in which it reciprocates, said head having an integral hollow open ended projection, of less diameter than the piston head with oppositely disposed bosses therein toward the open end thereof, in combination with a gudgeon pin carried in said bosses, and a sleeve fitting over the end of the hollow projection and inclosing the ends of the gudgeon pin the sleeve being rigidly secured to the hollow projection and adapted to take all lateral stresses communicated through the gudgeon pin.

12. A piston for internal combustion engines comprising a flanged disk with a solid face constituting a piston head constructed and designed to perform its piston functions without thrust on the wall of the cylinder in which it reciprocates, said head having an integral, hollow, open ended, projection of less diameter than the piston head with oppositely disposed bosses formed therein toward the open end thereof, in combination with a gudgeon pin carried freely in said bosses, and a sleeve fitting over the end of the hollow projection, the sleeve being rigidly secured to the hollow projection and adapted to take all lateral stresses communicated through the gudgeon pin.

In testimony whereof I have signed my name to this specification in the presence of two subscribing witnesses.

HARRY RALPH RICARDO.

Witnesses:
ERNEST PASK,
R. BAGGATT.